3,322,693
COBALT MOLYBDATE CATALYST FOR THE PRODUCTION OF ACRYLIC OR METHACRYLIC ACID

James Robert Bethell and David James Hadley, Epsom Downs, England, assignors to The Distillers Company Limited, Edinburgh, Scotland, a British company
No Drawing. Original application Aug. 29, 1961, Ser. No. 134,592. Divided and this application Feb. 18, 1965, Ser. No. 433,777
Claims priority, application Great Britain, Feb. 17, 1959, 5,396/59; Apr. 15, 1959, 12,881/59, 12,882/59; June 13, 1959, 20,304/59; Sept. 8, 1960, 30,923/60; Sept. 29, 1960, 33,411/60
1 Claim. (Cl. 252—470)

This application is a divisional application of co-pending application, Serial No. 134,592 filed August 29, 1961, now abandoned, which in turn was a continuation-in-part of co-pending application, Serial No. 4,221, filed January 25, 1960 and of U.S. Patent 3,098,102 issued January 16, 1963.

The present invention relates to a catalytic composition particularly for use in the production of unsaturated aliphatic acids such as acrylic acid and methacrylic acid.

Application Serial No. 4,221 describes and claims the process for the production of acrylic acid or methacrylic acid by reacting at an elevated temperature in the vapour phase acrolein or methacrolein or compounds yielding these substances under the reaction conditions, such as propylene, with molecular oxygen over an oxidation catalyst comprising (i) a mixture of the oxides of molybdenum and cobalt, and/or (ii) a compound of molybdenum, cobalt and oxygen, such as cobalt molybdate.

The catalyst for this process can be suitably prepared by precipitating a compound containing cobalt, molybdenum and oxygen by adding ammonia or a nitrogenous base to a mixed solution of cobalt and molybdenum salts, and heating the resulting precipitate.

It has now been discovered that the proportion of ammonia or nitrogenous base added to the mixed solution of cobalt and molybdenum salts is critical and that the best results are obtained when this proportion is maintained within certain limits.

Accordingly the present invention is a catalytic composition containing cobalt, molybdenum and oxygen prepared by adding a nitrogenous base to a solution or suspension of a cobalt salt and molybdic acid or a molybdate of a nitrogenous base to obtain a solution of pH less than about 7, and subjecting the resulting precipitate to a heat treatment.

The catalytic composition containing cobalt, molybdenum and oxygen is suitably formed by mixing an aqueous solution of a cationic cobalt salt, such as the nitrate, chloride or acetate, with an aqueous solution or suspension of molybdic acid or a molybdate, adding a nitrogenous base to the aqueous mixture in a proportion say for example between 0.5 and 1.5, gram-equivalents of base per gram-atom of cobalt such that the pH of the mixture does not exceed about 7, filtering off drying the resulting precipitate and subjecting it to a heat treatment. The maximum permissible pH values for the solution vary slightly according to the particular base used. As examples the maximum pH values employing ammonia have been found to be about 6.6 to 6.8 and employing ethylene diamine are about 6.4 to 7.2. The lower limit of pH is not critical since the activity of the catalyst does not fall with reduced pH, but final pH values below about 4 are undesirable as the precipitation of the cobalt molybdate is then incomplete and the yield of catalyst is thus diminished. To obtain the maximum quantity of catalyst with the maximum activity of final pH should be about 6–6.5.

Throughout this specification the values of pH quoted have been determined at 60° C. with a glass electrode, measurements being taken 15 seconds after addition of base to the solution of salts. The preferred nitrogenous base is ammonia. In general other suitable nitrogenous bases are those of the type $NH_2R$, $NHR_2$ and $NR_3$ such as the aliphatic amines, ethanolamine, ethylamine, triethylamine, ethylene diamine, aromatic or heterocyclic amines such as aniline, pyridine, cycloaliphatic amines, such as piperidine and compounds such as hydrazine. The temperature at which the precipitation is carried out is not critical, and temperatures between room temperature and about 100° C. are suitable. It is preferred to carry out the precipitation at temperatures above room temperature, as the precipitate produced at these temperatures is more easily filtered.

The atomic ratio of cobalt to molybdenum in the catalyst may vary within moderately wide limits, but should not be substantially greater than 1:1.

As indicated above the catalyst composition of the present invention may be employed in the process for the production of acrylic or methacrylic acid by the vapour phase reaction of acrolein or methacrolein or compounds yielding these substances under reaction conditions, e.g. propylene, with molecular oxygen.

By maintaining the proportion of base in the critical range set out above, high yields of unsaturated acids, based on aldehyde fed and on aldehyde consumed, are obtained. Furthermore the weight of active catalyst obtained in the precipitation step also varies with the proportion of base added, and is at a maximum when the proportion is maintained in the specified range.

The reaction may be carried out in any suitable manner, for instance under isothermal or adiabatic conditions and as a fixed or fluidised bed process. The proportion of aldehyde in the feed may vary within wide limits, for example between 1 and 20% by volume, and preferably between about 2 and 10% by volume. The concentration of oxygen in the feed may vary within moderately wide limits, for example between 1 and 20% by volume and preferably 2 and 15% by volume. The molecular oxygen containing gas may be diluted with inert gases, and may be, for example, supplied as air.

The reaction is suitably carried out in the presence, as diluent, of a gas which is substantially inert under the conditions of reaction, for example, nitrogen, propane, butane, isobutane, carbon dioxide and steam. It is preferred to use steam or nitrogen or mixtures thereof. The concentration of the steam may vary within wide limits, for instance between 20 and 60% by volume of the feed.

The reaction is carried out at an elevated temperature, preferably between 300 and 500° C.

The contact time may be for example in the range 1–30 seconds.

The process of the present invention is further illustrated by the following examples. In the examples, parts by weight and parts by volume bear the same relation to each other as do kilograms to litres.

Example 1

145.5 parts by weight of cobalt nitrate $$(Co(NO_3)_2 \cdot 6H_2O)$$

and 88.8 parts by weight of ammonium molybdate 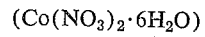 were dissolved in 320 parts by weight of water at 60° C., 108 parts by weight of a 5.14 N aqueous solution of ammonia, representing 1.15 gram-equivalents of ammonia per gram-atom of cobalt, was slowly added over a period of half an hour, and the mixture was stirred for a further 15 minutes. The resultant mixture gave a pH of 5 with a glass electrode under the conditions specified above. The precipitate was filtered off and washed twice by resuspension with 500 parts of distilled water. The precipitate was dried at 110° C., pelleted and heated at 600° C. for 16 hours. 105 parts by weight of catalyst were obtained.

A reactor containing the catalyst was heated in a liquid bath maintained at 361° C. A gaseous mixture of acrolein (10% by volume), nitrogen (50% by volume), oxygen (10% by volume) and steam (30% by volume) was passed over the catalyst, the contact time, defined as volumes of catalyst divided by volumes of reactants at normal temperature and pressure fed per second, being 3.5 seconds. Of the acrolein fed to the reactor, 59.2% was converted to acrylic acid. The yield of acrylic acid based on acrolein consumed was 66.9%.

*Example 2*

A series of catalysts was made up as described in Example 1, but different proportions of ammonia were used in the precipitation step. The catalysts were tested by the method given in Example 1. The results are shown in Table 1.

TABLE 1

| Run No. | Gram-equivalents of $NH_3$ per gram-atom of Co | pH | Parts by weight of catalyst obtained | Percent acrolein fed converted to acrylic acid | Percent yield of acrylic acid based on acrolein consumed |
| --- | --- | --- | --- | --- | --- |
| 1 | 0.5 | 3.6 | 51 | 60.2 | 63.1 |
| 2 | 0.95 | 4.3 | 88.7 | 57.3 | 63.0 |
| 3 | 1.35 | 6.2 | 109 | 64.4 | 66.5 |
| 4 | 1.45 | 6.6 | | 53.9 | 60.1 |
| 5 | 1.5 | 6.8 | | 26.3 | 49.5 |

By way of comparison with the above examples when the process was repeated over a catalyst made up as described in Example 1 except that the proportion of ammonia added in the precipitation step was 1.55 gram-equivalents per gram-atom of cobalt, only about 6% of the acrolein fed was converted to acrylic acid, and the yield of acrylic acid based on acrolein consumed was only 30%.

*Example 3*

145.5 parts by weight of cobalt nitrate was dissolved in 60 parts by weight of water at 60° C., and 88.3 parts by weight of ammonium molybdate, powdered to 30 mesh B.S.S. was dissolved in 260 parts by weight of water at 60° C. The two solutions were mixed and maintained at 60° C. with stirring, while 68.4 parts by weight of triethylamine was added over a period of 30 minutes; stirring was continued for a further 15 minutes. The resultant mixture gave a pH of 5.2 with a glass electrode under the conditions specified above. The precipitate was collected and washed twice by resuspension in 333 parts by weight of water. The solid was dried at 110° C., powdered to 30 mesh B.S.S. and pelleted. The catalyst was heat treated at 600° C. for 16 hours.

A gaseous mixture of 9.9% by volume of acrolein, 9.9% volume of oxygen, 50.3% by volume of nitrogen and 30% by volume of steam was passed over the catalyst in a reactor maintained at 400° C., the contact time being 3.6 seconds.

Of the acrolein fed to the reactor 61.6% was converted to acrylic acid, and 19.4% was recovered unchanged. The yield of acrylic acid based on the acrolein consumed was 76.5%.

Employing the above conditions but using catalysts prepared by use of different proportions of base per gram-atom of cobalt the following results were obtained.

TABLE 2

| Run No. | Gram-equivalent of ethylene diamine per gram-atom of cobalt | pH | Parts by weight of catalyst obtained | Percent acrolein fed converted to acrylic acid | Percent acrylic acid based on acrolein consumed |
| --- | --- | --- | --- | --- | --- |
| 1 | 0.75 | 3.7 | 54.6 | 65.9 | 73.3 |
| 2 | 1.0 | 3.9 | 95.0 | 57.3 | 70.1 |
| 3 | 1.35 | 5.2 | 105.0 | 60.0 | 66.1 |

*Example 4*

A catalyst was prepared as described in Example 1, except that the concentrations of cobalt nitrate, ammonium molybdate, and ammonia were reduced to ⅕ of those employed in Example 1. The catalyst, heat treated and tested as described in Example 1, gave a yield of acrylic acid, based on the acrolein consumed, of 72% of the acrolein fed to the reactor, 61.7% was converted to acrylic acid.

*Example 5*

291 parts by weight of cobalt nitrate was dissolved in 120 parts by weight of distilled water, and the solution was heated to 60° C.; 176.5 parts by weight of ammonium molybdate was dissolved in 520 parts by weight of distilled water at 60° C. The two solutions were mixed and well stirred.

397 parts by volume of diethylamine (2.52 N aqueous solution) was added dropwise over a period of 30 minutes and the temperature of the mixture kept at 55°–60° C. The mixture was stirred for a further 15 minutes after the addition was completed. The precipitate was filtered off, washed twice by resuspension with 1000 parts by weight of distilled water, and dried at 110° C. The resulting granules were ground to 8 mesh B.S.S. and heated at 600° C. for 16 hours.

*Example 6*

291 parts by weight of cobalt nitrate was dissolved in 120 parts by weight of distilled water, and the solution heated to 60° C. 176.5 parts by weight of ammonium molybdate was dissolved in 520 parts by weight of distilled water at 60° C. the two solutions were mixed and well stirred. 217 parts by volume of piperidine (4.61 N aqueous solution) was added dropwise over 30 minutes and the temperature of the mixture kept between 55° to 60° C. The mixture was stirred for a further 15 minutes, after the addition was completed. The resultant mixture gave a pH of 5.3 with a glass electrode under the conditions specified above. The precipitate was filtered off, washed twice by resuspension with 1000 parts of distilled water and dried at 110° C. The resulting granules were ground to 8 mesh and heated at 600° C. for 16 hours.

*Example 7*

Ammonium molybdate, 353.2 parts by weight, was ground to less than 30 mesh B.S.S., dissolved in 1040 parts by volume of distilled water at 60° C. and added to a solution of 582 parts by weight of cobalt nitrate dissolved in 240 parts by volume of distilled water at 60° C. The well stirred mixture was maintained at 60° C. whilst 420 parts by volume of a 4.77 N aqueous 1:2-diamino-ethane (ethylene diamine) solution was added dropwise over 30 minutes. The resultant mixture gave a pH of 4.8 with a glass electrode under the conditions specified above. The reaction mixture was then stirred for a further 15 minutes, the precipitate of cobalt molybdate filtered off, washed twice by resuspension in 1500 parts by volume of distilled water each time, and finally dried in air at 110° C. for 16 hours. The dried catalyst (453.4 parts by weight) was ground and sieved to less than 8 mesh B.S.S. and heated in granular form in air at 600° C. for 16 hours.

Example 8

A catalyst was prepared in an identical manner to the catalyst described in Example 7, except that 512 parts by volume of a 4.69 N aqueous ethylamine solution was used in place of the 420 parts by volume of a 4.77 N aqueous 1:2-diaminoethane (ethylene diamine) solution, the resultant mixture having a pH of 5.9 with a glass electrode under the specified conditions.

We claim:

A catalyst for the production of acrylic or methacrylic acid, said catalyst consisting essentially of cobalt, molybdenum and oxygen, said catalyst being the heat-treated precipitate of the addition of a nitrogenous base to an aqueous composition of a cobalt salt and a molybdenum compound selected from the group consisting of (1) a molybdic acid and (2) a molybdate of said nitrogenous base, the proportion of cobalt to molybdenum in said aqueous composition being not substantially greater than 1:1, to obtain from the addition of said nitrogenous base to said aqueous composition a pH less than about 7 and wherein the heat treatment of said precipitate is carried out at about 600° C.

References Cited

UNITED STATES PATENTS

| | | | |
|---|---|---|---|
| 2,325,033 | 7/1943 | Byrns | 252—439 |
| 2,369,432 | 2/1945 | Byrns | 252—470 |
| 2,393,288 | 1/1946 | Byrns | 252—465 X |
| 2,625,519 | 1/1953 | Hartig | 252—432 |
| 2,650,906 | 9/1953 | Engel et al. | 252—465 X |
| 2,677,649 | 5/1954 | Kirshenbaum et al. | 252—464 X |
| 3,058,802 | 10/1962 | Kulifay | 23—50 |
| 3,098,102 | 7/1963 | Bethell et al. | 260—604 |

FOREIGN PATENTS

791,725   3/1958   Great Britain.

OSCAR R. VERTIZ, *Primary Examiner.*

MILTON WEISSMAN, G. T. OZAKI,
*Assistant Examiners.*